(12) United States Patent
Daynès (10) Patent No.: US 6,910,039 B2
(45) Date of Patent: Jun. 21, 2005

(54) VALIDATION TECHNIQUE FOR BULK LOCK DELEGATION

(75) Inventor: Laurent P. Daynès, Sunnyvale, CA (US)

(73) Assignee: Sun Microsystems, Inc., Sunnyvale, CA (US)

(*) Notice: Subject to any disclaimer, the term of this patent is extended or adjusted under 35 U.S.C. 154(b) by 354 days.

(21) Appl. No.: 09/992,720

(22) Filed: Nov. 14, 2001

(65) Prior Publication Data

US 2003/0105755 A1 Jun. 5, 2003

(51) Int. Cl.$^7$ .......................... G06F 17/00; G06F 17/30
(52) U.S. Cl. ........................................ 707/8; 707/101
(58) Field of Search ............................ 707/8, 101, 200; 709/229; 711/163; 710/200, 220, 240–244

(56) References Cited

U.S. PATENT DOCUMENTS

| | | | | |
|---|---|---|---|---|
| 5,485,607 A | * | 1/1996 | Lomet et al. ................ 707/8 |
| 5,999,931 A | * | 12/1999 | Breitbart et al. ............ 707/10 |
| 6,044,466 A | * | 3/2000 | Anand et al. ............... 713/200 |
| 6,052,688 A | * | 4/2000 | Thorsen ..................... 707/100 |
| 6,182,186 B1 | | 1/2001 | Daynes |
| 6,343,339 B1 | | 1/2002 | Daynes |
| 2002/0103804 A1 | * | 8/2002 | Rothschild et al. .......... 707/10 |
| 2002/0152086 A1 | * | 10/2002 | Smith et al. ............... 705/1 |
| 2002/0178395 A1 | * | 11/2002 | Chen et al. ................ 714/2 |
| 2003/0014598 A1 | * | 1/2003 | Brown ....................... 711/141 |
| 2003/0101300 A1 | * | 5/2003 | Goldick ..................... 710/200 |

OTHER PUBLICATIONS

C. Pu, G. E. Kaiser, N. Hutchinson, "Split Transactions for Open–Ended Activities," in *Proc. of the ACM SIGMOD Int'l Conf. on Management of Data*, 1998, pp. 26–37 [online] [Retrieved from the Internet Jan. 31, 2003]<URL: http://citeseer.nj.nec.com/pu88splittransactions.html>.

G. E. Kaiser, C. Pu, "Dynamic Restructuring of Transactions," *Database Transaction Models for Advanced Applications*, Data Management Systems, Morgan–Kauffman, 1992, 27 pp. [online] [Retrieved from the Internet Jan. 31, 2003] <URL: http://citeseer.nj.nec.com/kaiser92dynamic.html>.

L. Daynés, "Implementation of Automated Fine–Granularity Locking in a Persistent Programming Language," *Software—Practice and Experience*, John Wiley & Sons, Ltd., 1999, 38 pp.

L. Daynés, et al, Customizable Concurrency Control for Persistent Java, *Advanced Transaction Models and Architectures*, Data Management Systems, Kluwer Academic Pub., Boston, 1997; Chap. 7, 34 pp.

Barbara Liskov et al., "Implementation of Argus", *Proceedings of 11$^{th}$ International Symposium on Operating System Principle* (SOSP), 1987, pp. 111–122.

(Continued)

*Primary Examiner*—Uyen Le
(74) *Attorney, Agent, or Firm*—Zagorin O'Brien Graham LLP (57) ABSTRACT

A lock management technique that combines low-space overhead via sharing of lock states of equal value with comprehensive support for bulk delegation of locks has been developed. Operating in conjunction with methods for validating delegation requests prior to their execution, bulk delegation of locks can be achieved with computational costs that are generally independent of the number of lock being delegated. This property, added to the low-space overhead representation of locks via lock state sharing, offer a combination that may be particularly attractive for systems that demand for fine-granularity locking, large transaction sizes (in term of number of locks acquired) and efficient bulk delegation mechanisms.

36 Claims, 6 Drawing Sheets

OTHER PUBLICATIONS

J.L.Eppinger et al., "Camelot and Avalon: A Distributed Transaction Facility", Morgan Kaufmann Publishers, San Mateo, California, 1991, pp. 3–11, 81–92, 121–162 and 251–286.

Laurent Daynes et al., "Locking on OODBMS Client Supporting Nested Transactions", IEEE 11th *International Conference on Data Engineering*, France, 1995, pp. 316–323.

Ole Anfindsen, "Apotram—An Application–Oriented Transaction Model", PhD Thesis, University of Olso, Dept. of Informatics, Oslo, Norway, 1997.

Roger S. Barga and Calton Pu, "A Reflective Framework for Implementing Extended Transactions", *Advanced Transaction Models and Architectures*, Data Management Systems, Chapter 3, Kluwe Academic Publishers, Boston, 1997, pp. 63–89.

Laurent Daynes and Oliver Gruber, "Customizing Concurrency Control Using Graph of Locking Capabilities", *Sixth International Workshop on Persistent Object Systems*, France, Sep. 1994, Springer–Verlag, pp. 147–161.

T. Harder et al., "Supporting Parallelism in Engineering Databases by Nested Transactions," Technical Report #34/1992, University of Kaiserslautern, [Online] [Retrieved from the Internet Dec. 3, 2002]0 <URL: http://wwwdbis.informatik.uni–kl.de/pubs/papers/HPS92.SFB.html>.

A. Biliris et al, "ASSET: A System Supporting Extended Transaction," in *Proc. of ACM SIGMOD Int'l Conf. on Management of Data*, Minneapolis, MN, May 1994, pp. 44–54 [online] [Retrieved from the Internet Dec. 3, 2002] <URL: http://www.cs.umass.edu/Dienst/UI/2.0/Describe/ncstrl.umassa_cs/UM–CS–1994–027>.

E. T. Mueller, J. D. Moore and G. J. Popek, "A Nested Transaction Mechanism for LUCUS," in *Proc. of 9th Int'l Symposium on Operating System Principle* (SOSP), 1983, pp. 71–89 [online] [Retrieved from the Internet Jan. 31, 2003] <URL: http://www.cis.upenn.edu/~bepierce/courses/dd/topics.html>.

J. Eliot B. Moss, "Nested Transactions: An Approach to Reliable Distributed Computing," PhD Thesis, MIT, Apr. 1981, [online] [Retrieved from the Internet Jan. 31, 2003] <URL:http://citeseer.nj.nec.com/eliot81nested.html>.

L. Daynés et al., "Efficient Support for Customizing Concurrency Control in Persistent Java," in *International Workshop on Advanced Transaction Models and Architectures* (ATMA), India, Sep. 1996, pp. 216–233 [online] [Retrieved from the Internet Jan. 31, 2003]<URL: http://citeseer.nj.nec.com/daynes96efficient.html>.

S. K. Shrivastava and S. M. Wheater, "Implementing Fault––Tolerant Distributed Applications Using Objects and Multi–Couloured Actions," in *Proc. of Int'l Conf. on Distributed Computing Systems*, Paris, France, May 1990.

T. Harder and K. Rothermel, "Concurrency Control Issues in Nested Transactions," VLDE Journal, 1993, 2(1):39–74, [online] [Retreived from the Internet Jan. 31, 2003]<URL: http://citeseer.nj.nec.com/473908.html>.

Laurent Daynes and G. Czajkowski, High Performance, Space–Efficient, Automated Object Locking, *IEEE 17th International Conference on Data Engineering*, Heidleberg, Germany, Apr. 2001.

* cited by examiner

```
delegate(delegators, delegatees)
begin
    foreach l in TSLS
        if ∃ M, (delegators ∩ Owners(l, M) ≠ ∅) ∧ (∄ M_i, M_i > M ∧ (delegators ∩ Owners(l, M_i) ≠ ∅))
            TSLS.remove(l)
            // modify its owner set to reflect the effect of delegation
            foreach M_i, M_i ≤ M
301 ─────── Owners(l, M_i) ← [Owners(l, M_i) - delegators] ∪ delegatees
            end
            // does the new value duplicate an existing shared lock state ?
            if TSLS.contains(l)
                // yes. record the "original" being duplicated
                // and add the shared lock state to the set of duplicates.
                original(l) ← TSLS.get(l)
                duplicates.add(l)
            else
                // no. Re-enter the modified shared lock in the TSLS.
                TSLS.add(l)
            endif
        endif
    end
    // Process duplicates now.
    foreach l in duplicates
        if ∃ M, (delegators ∩ Owners(l, M) ≠ ∅) ∧ (∄ M_i, M_i > M ∧ (delegators ∩ Owners(l, M_i) ≠ ∅))
            // modify its owner set to reflect the effect of delegation
            foreach M_i, M_i ≤ M
                Owners(l, M_i) ← [Owners(l, M_i) - delegators] ∪ delegatees
            end
        endif
    end
end
```

FIG. 3

```
// Determine the validity of a delegating a lock set to the value l
boolean isValid(delegators, delegatees, l)
begin
    if Owners(l, Write) = ∅
        return true
    endif
    // at least one write lock owner
    if Owners(l, Write) ∩ delegators = ∅
        // All the delegators are read owners.
        // The delegation is valid if all delegatees can ignore read-write
        // conflicts with the write owners.
        return ∀t ∈ delegatees, Owners(l, Write) ⊆ ICW(t, rw)
    endif
    // the lock is delegated in write mode – all delegatees must ignore
    // write-write conflicts between each others and with each remaining
    // owners of the lock in write mode. Also, write-read conflicts should
    // be ignored with remaining owners of the lock in read mode.
    if |delegatees| > 1
        // More than one delegatee
        if ∃ t ∈ delegatees, (Owners(l, Write) − delegators) ⊄ ICW(t, ww)
            return false
        endif
    endif
    if ∃ t ∈ delegatees, (Owners(l, Write) − delegators) ⊄ ICW(t, c)
        return false
    endif
    if ∃ t ∈ delegatees, (Owners(l, Read) − delegators) ⊄ ICW(t, wr)
        return false
    endif
    return true
end
```

```
// Determine the validity of a bulk lock delegation
boolean isValid(delegators, delegatees)
begin
602 ──  if wset ∩ delegators = ∅
            return true
603 ──  else if (∀ t_s ∈ delegatees, ∀ t_d ∈ delegators, ∀ C ∈ {rw, wr, ww},
            (ICW(t_s, C) - (delegators ∪ {t_d})) ⊆ ICW(t_d, C)
            // if at least one of the delegated lock is a write lock, the request
            // is valid only if the delegatees can ignore all conflicts which each other
            if ∃ l, Owners(l, Write) ∩ delegators ≠ ∅
                return (∀ t ∈ delegatees, ∀ c ∈ {rw, wr, ww}, delegatees ⊆ ICW(t, c))
            else
                return true
            endif
        else
            // The two conservative tests have failed
            foreach l in TSLS
601 ──      if Owners(l, W) ≠ ∅ ∧ (∃M, Owners(l, M) ∩ delegators ≠ ∅)
                if ¬isValid(delegators, delegatees, l)
                    return false
                endif
            endif
        end
    endif
    return true
end
```

FIG. 6

VALIDATION TECHNIQUE FOR BULK LOCK DELEGATION

RELATED APPLICATIONS

This application is related to co-pending, commonly owned U.S. patent application Ser. No. 09/992,721, entitled, "Lock Delegation with Space-Efficient Lock Management," and naming Laurent P. Daynès, filed on even date herewith, Nov. 14, 2001, the entirety of which is incorporated herein by reference.

BACKGROUND

1. Field of the Invention

The invention relates to concurrency control and, in particular, to lock management techniques that allow efficient bulk delegation of locks in database and/or transaction processing systems.

2. Description of the Related Art

Delegation of locks forms a basis for concurrency control in many modem transaction models, such as nested transaction models (see e.g., J. E. B. Moss, *Nested Transactions: An Approach to Reliable Distributed Computing*, Ph.D. thesis, Massachusetts Institute of Technology, Apr. 1981; T. Harder and K. Rothermel. *Concurrency Control Issues in Nested Transactions*, VLDB Journal, 2(1):39–74, 1993), split-join transaction models (see e.g., C. Pu, G. E. Kaiser, and N. Hutchinson, *Split-Transactions for Open-Ended Activities*, In Proc. of the ACM SIGMOD Int. Conf. on Management of Data, pp. 26–37, 1988; G. E. Kaiser and C. Pu, *Dynamic Restructuring of Transactions*, In Database Transaction Models for Advanced Applications, Data Management Systems, Morgan-Kaufman, pp. 266–295, 1992), colored actions (see e.g., S. K. Shrivastava and S. M. Wheater, *Implementing Fault-Tolerant Distributed Applications Using Objects and Multi-coloured Actions*, In Proc. of the Int. Conf. on Distributed Computing Systems, pp. 203–210, 1990), or the Apotram transaction model (see O. Anfindsen, *Apotram—an Application-Oriented Transaction Model*, Ph.D. thesis, University of Oslo, Department of Informatics, 1997). Various of these models are characterized by the delegation of locks at some point in the life of a transaction or assimilated entity. For example, the join operation of split-join transactions is a straightforward use of lock delegation. In the nested transaction model, a sub-transaction delegates all its locks to its parent transaction upon its commit. Similarly, lock delegation can be used to achieve the effect of moving objects upward or downward in a hierarchy of nested databases. Typically, a transaction model that imposes hierarchical structure and relies on locking for concurrency control uses some form of lock delegation to control lock ownership across levels of the hierarchy.

Often, transaction models assume that a transaction may delegate a single lock or a specific subset of its locks to other transactions. Often, it is desirable to delegate locks in bulk. For example, bulk delegation is assumed for most hierarchical transaction models, such as the nested transaction model, where delegation is useful to transfer the locks of a committed transaction to the next transaction up the hierarchy. Because commitment of a nested transaction is a common case, special attention should be paid to optimize bulk delegation. Unfortunately, most implementations focus on the case of single lock delegation and do not pay particular attention to efficiency of bulk delegation, instead implementing bulk delegation as a sequence of single lock delegation operations. Typically, such implementations of bulk delegation involve traversing and updating linked-lists of lock request control blocks (LRCBs). Scaling performance of such implementations is poor.

One alternative bulk delegation technique is the applicant's own prior work (described in L. Daynès, M. P. Atkinson, and P. Valduriez, *Efficient Support for Customizing Concurrency Control in Persistent Java*, In E. Bertino, S. Jajodia, and L. Kerschberg, editors, International Workshop on Advanced Transaction Models and Architectures (ATMA), pp. 216–233, Goa, India, Sep. 1996). Using that technique, the effect of a bulk lock delegation is achieved not by updating individual locks, but by changing the conflict detection mechanisms of the delegatee, using a lock manager ability's to represent ignore-conflict relationships between transactions. Unfortunately, while that technique tends to decouple the cost of bulk delegation from the number of locks delegated, it still suffers from poor scaling performance because space used to represent locks grows in proportion with the number of locks represented.

A bulk delegation implements a transfer of the ownership of a potentially large number of locks. The transfer is performed atomically with respect to all other locking operations, in particular, concurrent lock acquisition, release or delegation. In general, a validation of a bulk delegation verifies that the effect of a delegation of locks is legal, that is, that it results in lock values that can be otherwise achieved by a legal combination of lock release and acquisition for a given setting of ignore-conflict relationships (including when no ignore-conflict relationships are used).

A transaction model typically imposes and enforces some rules on how delegation and ignore-conflict relationships are used to implement its semantics. It is often the case that these rules guaranty that only valid requests for lock delegation are submitted to a lock manager. For instance, the locking and termination rules of a nested transaction model are such that validation is unnecessary in that case. However, in flexible transaction processing environment where applications are given access to the lock manager interface, in particular, for lock delegation and settings of ignore-conflict relationships, the lock manager cannot trust the applications to always submit valid lock delegation requests. Because the transfer of lock ownership needs to be atomic, a lock manager cannot discover that a bulk delegation is invalid while in the middle of processing it. Doing so may allow some transactions to see some effects of an invalid bulk delegation of locks and to wrongly exploit this error. It also raises the problem of undoing the bulk delegation of locks, which substantially adds complexity to a lock manager implementation. Instead, what is preferable is a fast validation method that can be employed prior to performing the bulk delegation to determine if the bulk delegation request is valid.

For such an approach to work, additional mechanisms are needed to ensure the atomicity of a bulk lock delegation. There are various ways that atomicity may be guaranteed. An obvious one is to block all locking operations during the processing of a bulk lock delegation, but this approach is in general unacceptable.

A minimum requirement to guarantee atomicity of a bulk delegation is to prevent the set of locks being delegated to change during the bulk delegation operation. A bulk delegation specifies the set of locks being delegated in an abstract way, e.g., the set of all the locks owned in write mode by a transaction. As a result, a concurrent lock acquisition by a delegator, or a concurrent delegation of locks to the delegator may change the set of locks being delegated. In order to prevent the set of delegated locks to change, the delegator must be prevented from performing other locking operations concurrently (e.g., release, delegate or acquire locks), or from being a delegatee in other concurrent lock delegation operations.

If ignore-conflict relationships between transactions are used, an additional requirement is to prevent the ignore-conflict relationships that involve any of the delegators and delegatees to change in a way that may impact the correctness of the bulk delegation (one can simply prevent removal of ignore-conflict relationships that involve any delegator or delegatee of the bulk delegation, as a fair conservative approximation of such changes).

In some cases, a transaction model may enforce the above requirements. For instance, implementations of the nested transaction model strictly limit the use of bulk delegation to when a sub-transaction terminates. In this case the sub-transaction is guaranteed not to perform any other locking operations since it is terminating. It is also guaranteed not to be involved in other lock delegation operations since only its own sub-transactions can delegate locks to it, and these must be already terminated in order for the first transaction to complete. Similarly, the use of ignore-conflict relationship by the nested transaction model is such that concurrent change to ignore-conflict relationships can never impact a bulk delegation.

To summarize, the atomicity of a bulk lock delegation can be achieved if:

the set of locks being delegated does not change during delegation, ignore-conflict relationships involving the delegator transactions are not changed in ways that impact a lock delegation, given the first two conditions, a validation method is used to guarantee that the bulk delegation will succeed.

Irrespective of how the first two conditions are implemented, need exists for techniques that efficiently determine whether a bulk lock delegation is valid.

SUMMARY

Computationally-efficient validation of bulk lock delegation requests is desirable for practical implementations of bulk lock delegation operations. Some implementations of bulk lock delegation, such as that described in a co-pending U.S. Patent Application entitled, "Lock Delegation with Space-Efficient Lock Management," and naming Laurent Daynès, filed on even date herewith, build on lock state sharing to provide a low-space overhead lock management facility with support for bulk lock delegation. However, in general, the desirability of validation techniques such as described herein is not limited to such implementations. Indeed, bulk delegation request validation techniques described herein may contribute to a variety of implementations of bulk lock delegation facilities, and in some realizations, may even be independently realized. In some realizations, validation techniques are implemented in conjunction with a lock manager that employs an encoding of shared lock states. Some implementations provide bulk lock delegation with computational costs, including validation costs, that are generally independent of the number of locks being delegated. Accordingly, such implementations may be particularly attractive for systems that demand for fine-granularity locking, large transaction sizes (in term of number of locks acquired), and efficient delegation mechanisms.

In one embodiment in accordance with the present invention, a method of operating a transaction system which supports bulk delegations of locks includes validating at least a subset of the bulk lock delegations by, for each delegated lock owned by a delegator transaction, testing validity of delegating the lock based, at least in part, on ignore conflicts relationships amongst the delegatee transactions and between the delegatee transactions and otherwise incompatible-mode owners of locks, which would remain after completion of the bulk delegation. In some variations, the method further includes performing the validated bulk lock delegations. In some variations, the method further includes obviating the testing of each lock value for at least another subset of the bulk lock delegations by performing one or more conservative tests.

In another embodiment in accordance with the present invention, a method of validating bulk delegation of locks has been developed for a computational system wherein a value of a lock is encoded to identify (i) a set of one or more transactions that own the lock and (ii) respective one or more modes in which such transactions own the lock, and wherein at least some locks of equal value are represented using a same shared lock state. The method of validating bulk delegation of locks from one or more delegator transactions to one or more delegatee transactions includes, for at least a subset of the bulk delegations, and for each shared lock state encoding having an associated owner set that includes at least one of the delegator transactions, testing validity of delegating a lock represented thereby based, at least in part, on ignore conflicts relationships amongst the delegates transactions and between the delegatee transactions and otherwise incompatible-mode owners that would remain after completion of the bulk delegation. In some variations, the method further includes, for each of the bulk delegations, performing one or more conservative validation tests and thereby obviating, for another subset of the bulk delegations, the validity testing for each shared lock state.

In still another embodiment in accordance with the present invention, a method of implementing a bulk delegation of locks from one or more delegator transactions to one or more delegates transactions includes validating the bulk delegation based at least in part on ignore conflicts relationships amongst the delegates transactions, and if validated, performing the bulk delegation.

In still yet another embodiment in accordance with the present invention, a transaction processing system that supports bulk delegation of locks includes a lock manager and an encoding of ignore conflicts relationships amongst the transactions. The lock manager associates locking capabilities with transactions and allows specification of certain conflicts between locking capabilities to be ignored. The lock manager implements at least a subset of bulk delegation operations by first validating requests therefor based on encoded ignore conflicts relationships amongst the delegates transactions and between the delegatee transactions and otherwise incompatible-mode owners that would remain after completion of the bulk delegation, and if the requests are validated by performing the bulk delegation operations.

In still yet another embodiment in accordance with the present invention, a lock manager implements a bulk delegation operation by validating a bulk delegation request based, at least in part, on ignore conflicts relationships amongst delegates transactions.

In still yet another embodiment in accordance with the present invention, a computer program product is encoded in one or more computer readable media includes a definition of a data structure instantiable in memory to represent identical lock states associated with separate transactions using a shared lock state encoding and lock manager instructions executable by a processor to associate locking capabilities with transactions, to specify certain conflicts between locking capabilities to be ignored, to manage the shared lock state encoding, and to implement a bulk delegation of locks from one or more delegator transactions to one or more delegatee transactions. The lock manager instructions validate a bulk delegation request based, at least in part, on ignore conflicts relationships amongst the delegatee transactions.

In still yet another embodiment in accordance with the present invention, an apparatus includes means for representing identical lock states associated with separate transactions using a shared lock state encoding, and means for validating a bulk delegation of locks from one or more delegator transactions to one or more delegatee transactions based, at least in part, on ignore conflicts relationships amongst the delegatee transactions.

These and other embodiments in accordance with the claims that follow will be understood with reference to the description and drawings herein.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows presents a set of techniques, systems, objects, functional sequences and data structures associated with concurrency controls for cooperative operations on resources. An exemplary implementation focuses on an environment in which the semantics of certain operations are provided, at least in part, using a bulk lock delegation mechanism and ignore conflict relationships between transactions. For example, in an exploitation for a nested transaction model, such as described in U.S. patent application Ser. No. 09/714,336, entitled "Implementation of Nested Databases using Flexible Locking Mechanisms" and naming Laurent Daynès and Ole Jorgen Anfindsen as inventors, bulk lock delegation may be used to support operations such as creation, commitment or abortion of a sub-database using techniques of the present invention. To facilitate understanding of one such exploitation, U.S. patent application Ser. No. 09/714,336 is incorporated in its entirety herein by reference. Nonetheless, other exploitations for other transaction models, now defined or hereafter developed, may also employ techniques of the present invention for, or to facilitate, computationally efficient bulk delegation of locks.

In general, techniques, systems, objects, functional sequences and data structures of the present invention may be used in combination and/or integrated with applications, locking facilities and/or transaction processing systems. For example, without limitation, realizations in accordance with the present invention may be embodied as (1) functionality integrated or supplied with transaction generating applications (e.g., as functions, libraries or services thereof), as (2) functionality (e.g., as processes, services, etc.) interposed or suitable as an intermediary between transaction generating applications and a locking facility of a transaction processing system, (3) as functionality providing such a locking facility, or as (4) functionality supporting a bulk lock delegation in a database or transaction processing system that employs lock state sharing as part of its underlying lock management facility. Furthermore, while much of the description that follows focuses on transactions, persons of ordinary skill in the art will appreciate based on the description herein that systems are envisioned in which locks (or more generally, locking capabilities) are associated with a variety of entities (e.g., transactions, cooperating groups, logical databases, etc.) that control visibility of shared data or resources.

Terminology

Bulk Delegation

This patent application describes techniques to efficiently implement lock delegation, a locking operation that atomically transfers ownership of a lock. As will be described in detail below, one particular advantage of these techniques is their computational efficiency when employed to implement bulk lock delegations, e.g., delegation of all locks owned by a particular transaction to one or more delegatee transactions. In particular, some implementations of the techniques exhibit the desirable property that computational cost of a bulk delegation is independent of the number of locks delegated.

In general, lock delegation takes place between two transactions, the delegator and the delegatee. However, in some cases, more complex forms of bulk lock delegation may be desirable. For instance, multiple owners of a given lock may simultaneously delegate their locks to a single delegatee. Similarly, a single delegator may need to simultaneously delegate its lock(s) to more than one delegatee. In general, multiple delegators, multiple delegatees and/or multiple locks may be transferred as part of a bulk lock delegation. In some exploitations, all locks held by a set of delegators will be transferred as part of a bulk lock delegation to a set of delegatees; however in some implementations it may be desirable to delegate only locks owned (or held)

in a particular mode: e.g., read locks, write locks, locks protecting new objects only, etc.

Therefore, for purposes of illustration, a generic bulk lock delegation operation will be understood to include three parameters:

1. a list of delegator(s),
2. a list of delegatee(s), and
3. some identification of the type of locks that are to be delegated.

However, based on the description herein, persons of ordinary skill in the art will appreciate other less-fully-parameterized operations that may be suitable for a particular realization. For example, some realizations need not discriminate between lock types. In some realizations, one-to-many or many-to-one bulk delegation need not be implemented. Whatever the particular mix of bulk delegation requirements, persons of ordinary skill in the art will recognize suitable implementations based on the description herein.

Lock State Sharing

In general, the terms lock, lock value and lock state denote three different things: (1) a lock holds information about who can access in what mode the resource it is associated with, (2) a lock value is an encoding of the information held by a lock, and (3) a lock state is a data structure that holds a particular lock value.

Lock state sharing techniques are based on the observation that many locks end up having the same value. Hence, instead of representing each individual lock with a distinct data structure (i.e., a distinct lock state), a lock can be represented by a reference (e.g., a virtual memory pointer) to a single data structure that hold the value of that lock. In other words, multiple locks with the same value are implemented as multiple references to the same lock state holding that lock value (hence the name shared lock states, since the same lock state is used to represent more that one lock).

Under lock state sharing, modifying the value of a lock associated with a resource is achieved by atomically changing the reference to a shared lock state currently associated with that resource with a reference to another shared lock state that holds the new value corresponding to the modified lock value. The acquisition of a lock by a transaction amounts to changing the value of a lock, which, under lock state sharing, as stated above, amounts to changing references to shared lock states. Similarly, locking operations that modify the value of a single lock at a time, such as releasing a single lock, or delegating a single lock, are implemented under lock state sharing by changing references to shared lock states.

Lock state sharing has been employed in persistent object systems and programming languages, in which the granularity of locking is the object, and where transactions commonly manipulate very large numbers of objects (in the order of $10^5$ objects, or more) as a result of the relatively small size of objects (typically, between 20 and 40 bytes). This combination results in transactions requesting a large number of locks, making the space consumed to represent a single lock an important performance parameter.

Figure 1:
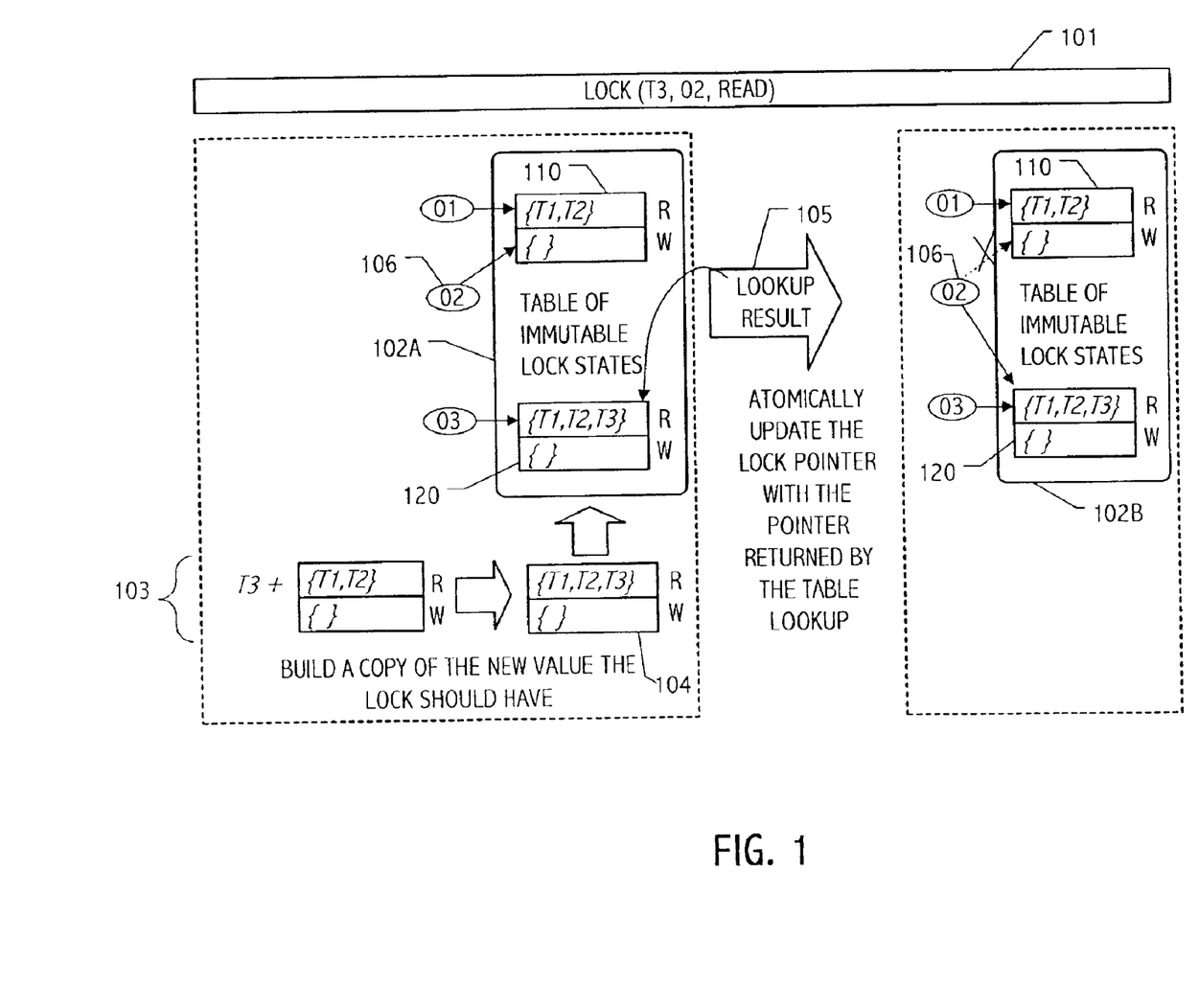
FIG. 1 depicts relationships between locked resources and locks represented using references to shared lock states during lock acquisition in accordance with some embodiments of the present invention.

FIG. 1 illustrates such a lock state sharing approach. In particular, FIG. 1 depicts a simple situation where only two lock values, represented by two shared lock states 110 and 111, are in use by the system. The locks on resources O1 and O2 are represented as pointers to the same shared lock state since they have the same value, whereas the lock on O3, which has a different value, is a pointer to a different shared lock state.

FIG. 1 also depicts acquisition, by a transaction T3, of a read lock on resource O2 in accordance with lock request 101. Given an initial set of shared lock states, e.g., as represented by a table thereof in accordance with initial set 102A, a resultant set of shared lock states is computed, e.g., as represented by a table thereof in accordance with resultant set 102B. In the illustrated configuration, the requester (or functionality responsive to the lock request) builds the new lock value that the lock on resource O2 should have (see building sequence 103). As illustrated, the initial set 102A (i.e., the then current set) of shared lock states is searched (lookup 105) for a shared lock state that represents the lock value 104. If none is found, the new lock value is recorded in the table as a shared lock state whose pointer is then used to encode the new value of the lock on resource O2. Alternatively, if a matching shared lock state is found, its pointer is used to encode the new value of the lock on resource O2. To effect the change in lock value, the shared lock state pointer encoding the value of O2's lock is atomically replaced with the one just obtained. If the atomic update fails (e.g., because of a concurrent lock management operation), then the sequence of operations may be performed again.

Various lock state sharing implementations have been devised and may be employed in a given realization. Straightforward implementations typically keep track of the locks of each transaction by recording in one or more book-keeping data structures the references to all resources locked by each transaction. An improved variation, eliminates such book-keeping of locked resources, and instead allows shared lock state to be mutated to reflect the result of releasing all the locks of a transaction at once (i.e., a bulk lock release, which is the most common form of lock release operation). Although more complex, such an implementation can reduce memory consumption by eliminating lock book-keeping data structures and makes bulk lock release independent of the number of locked resources. Addition of memoization and inlined ownership test techniques can also considerably improved the performance of locking operations.

While a variety of lock state sharing techniques and implementations may be employed (see generally, L. Daynes, *Implementation of Automated Fine-Granularity Locking in a Persistent Programming Language*, Software-Practice and Experience, 30(4):325–361, 2000, for a review of some exemplary variations; see also U.S. Pat. No. 6,182, 186 to Daynes, which is incorporated herein in its entirety by reference, and which describes in detail some suitable implementations of lock state sharing techniques), the description that follows focuses on an implementation that employs memoization techniques (see below) and does not keep track of acquired locks. Performance, both in terms of processing time and memory consumption, of the illustrated implementation has generally been preferable as compared with other implementations. Nonetheless, based on the description herein, persons of ordinary skill in the art will appreciate implementations that build on any of a variety of techniques for lock state sharing. Adaptation (for other such variants of lock state sharing) of the mechanisms presented in detail herein is straightforward.

Ignore-Conflict Relationships

Ignore-conflict relationships allow customization of the conflict detection mechanisms of a lock manager. A traditional lock manager diagnoses a conflict based on a lock mode compatibility table. Each lock mode corresponds to one or more particular data operations. A transaction processing system enforces the condition that a transaction performs an operation if and only if it owns the lock on the data manipulated by that operation in a mode that corresponds to that operation. If another transaction already owns the lock in a mode incompatible with the requested mode, a conflict is diagnosed, and, as a result, some action to handle the conflict is triggered (e.g., insertion of the request to the lock pending queue, or notification of the conflict to some conflict resolution entity). In general, lock manager facilities and suitable implementations thereof are well known to persons of ordinary skill in the art.

By using ignore-conflict relationships between transactions, a transaction manager can override the lock manager decision, which is based otherwise only on lock mode compatibility. Typically, the lock manager associates each transaction T with a set ICW (T, c) per type of conflict c. When the lock manager uses read and write lock modes, c can have three values: rw (read-write conflicts), wr (write-read conflicts), and ww (write-write conflicts). Suitable extensions to systems that provide larger (or different) sets of lock modes are straightforward.

In general, a conflict can be represented as a pair (c, s), where c identifies the type of the conflict, and s is the set of owners of the lock that conflicts with the requester. For a given request issued by a transaction T, a lock manager that is cognizant of ignore-conflict relationships can ignore the conflict (c, s) if s is a subset of ICW (T, c). Any of a variety of transaction systems and lock manager implementations that utilize ignore-conflict relationships are possible and will be recognized by persons of ordinary skill in the art. For example, some suitable variations are illustrated in L. Daynes, M. P. Atkinson, and P. Valduriez, *Customizable Concurrency Control for Persistent Java*, in S. Jajodia and L. Kerschberg, editors, *Advanced Transaction Models and Architectures, Data Management Systems*, chapter 7, Kluwer Academic Publishers, Boston, 1997. In some cases, implementations that utilize ignore conflicts representations can support implementations of other advanced transaction models, such as those that support conditional conflict serializability using parameterized lock modes. See e.g., co-pending U.S. patent application Ser. No. 09/663,208, entitled Implementation of Parameterized Locking Modes Using Ignore-Conflict Relationships, naming Laurent Daynes and Ole J. Anfindsen as inventors, which is incorporated herein by reference in its entirety.

Lock Delegation with Lock State Sharing

In some implementations in accordance with the present invention, lock delegation proceeds in two steps: first, the validity of the requested bulk operation is verified; then, the transfer of ownerships between the delegators and delegatees is performed atomically with respect to all other locking operations (lock acquisitions, lock releases, and other lock delegations). Both validation and performance of the bulk transfer are described herein. However, as will be clear to persons of ordinary skill in the art having benefit of this disclosure, certain implementations in accordance with the present invention need not implement both validation and performance of the bulk transfer, or need not implement the particular validation or bulk transfer techniques illustrated. Indeed, the techniques employed for validation and performance of the bulk transfer are largely separable and may be employed independently of each other. Indeed, some realizations of a bulk transfer operation may rely upon an independent facility to ensure the validity of a bulk delegation request.

Accordingly, although exemplary implementations described herein include both aspects in a unified design, persons of ordinary skill in the art will recognize, particularly in light of the claims that follow, the potential independence of validation of a requested bulk delegation operation and performance of such an operation (with or without validation). In view of the foregoing, and without limitation, bulk transfer techniques are first described, followed by description of a suitable, though separable, validation technique. To facilitate understanding, an illustrative set of lock manager data structures are introduced first. Then, ownership transfer is discussed next for the following cases: (1) single lock delegation, (2) memoization-based delegation, (3) optimized bulk lock delegation, and (4) lock delegation when the delegated lock has a non-empty queue of pending requests.

Lock Manager Data Structure

An exemplary lock manager that implements lock state sharing includes four principal data structures:

1. Lock State. A data structure that represents the value of a lock (a lock value for short).
2. Locking context. Information maintained by the lock manager for each transaction (or equivalent).
3. Thread Locking context. Information maintained by the lock manager for each thread of control involved in lock management functions.
4. Table of shared lock states (TSLS). An associative search data structure that keeps track of all the shared lock states currently used to represent locks. Lock state values are used as key for searches.

Conceptually, the value of a lock is represented as sets of transactions (typically, one set per lock mode) representing the owners of the lock, and a queue, which may be empty, of pending lock requests. One efficient data structure representation for each transaction set is as bitmaps (or bit-sets). However, other ways of representing sets of transaction identifiers are also suitable. For example, representations of a lock as a linked-list of lock request control blocks can also be used. In such case, a single linked-list representing the union of all the transaction sets may be used.

For simplicity, the description that follows assumes an abstract representation that includes a set of transactions per lock mode (denoted Owners (l, M)) for a given lock l and a mode M, and a queue of pending lock request Q (l) for lock l. Furthermore, only read and write lock modes are considered. Variations for a larger set of lock modes are straightforward and, based on the description herein, will be readily appreciated by persons of ordinary skill in the art.

As a general matter, the implementation described herein does not assume a particular technique for associating a resource with the lock that protects it. For a given resource r, its lock is denoted lock(r). Note that in the context of a lock state sharing implementation, lock(r) is typically implemented as a pointer to a shared lock state. In some implementations of lock state sharing, lock(r) is associated with r by storing lock state directly in storage of resource r. Suitable techniques for efficiently maintaining such a direct association despite the possible movements of a locked resource across various level of a memory hierarchy (e.g., main-memory and secondary storage) are detailed in one or more of the above-identified and/or incorporated references.

Single Lock Delegation

Using lock state sharing techniques, delegation of a single lock follows the same principle as other locking operations such as described above with reference to FIG. 1. For example, a lock state data structure is first initialized with the value that the lock should have after delegation, and used as a key for searching the TSLS. If no shared lock states with that value is found, a new one is recorded in the TSLS. The lock pointer to the shared lock state representing the lock being delegated is then atomically replaced with the pointer to the new lock value obtained from the TSLS. If the atomic replacement fails, the whole procedure is repeated, but using the most recent shared lock state associated with the resource whose lock is delegated.

The lock value representing the effect of delegation is computed by replacing the delegators with the delegatees from each of the owner sets involved with the delegation. In one variant of lock state sharing considered herein, granting a lock in mode M also grants the lock in all other modes covered by M. Lock coverage is denoted using the arithmetical comparators (e.g., =, <, >, $\leq$, $\geq$). When considering read and write lock modes only, the following coverage of lock modes is defined: W>R, W=W and R=R. Given these definitions, computing the value of a lock after a delegation can be implemented according to the following pseudocode:

```
LockState computeEffectOfDelegation(delegators, delegatees, M, o)
begin
    // copy the original lock state representing the delegated lock's
    current value LockState l ← lock(o)
    // modify its owner set to reflect the effect of delegation
    foreach M_i, M_i ≦ M
        Owners(l, M_i) ← (Owners(l, M_i)-delegators)∪delegatees
    end
    return l
end
``` where o is the resource whose lock is delegated.

A similar computation can be performed for a more general case that does not rely on the semantics described above (i.e., that a lock granted in mode M automatically grants the lock in mode covered by M). This more general case slightly changes the pseudocode as follows:

```
LockState computeEffectOfDelegation(delegators, delegatees, o)
begin
    LockState l ← lock(o)
    for all M_i,
    if((Owners(l,M_i)∩delegators == ∅)
        Owners(l, M_i) ← (Owners(l, M_i)-delegators)∪delegatees
    endif
    end
    return l
end
```

Variations on the basic implementation are also suitable. For example, in some implementations, changes in the owner sets of a lock value may involve further state changes. For instance, in a bitmap-based implementation, each lock value may be associated with a type that indicates whether the lock is owned by a single owner, whether it is owned in read-mode only, or whether it has a non-empty queue of pending requests. In such a representation, changing the owner sets of the initial lock value may also require changing its type.

Also, a lock manager may maintain direct pointers to frequently used shared lock states, and omit such states from the TSLS. For instance, shared lock states representing locks owned in read, or write, mode by a single owner (SO lock states) may be omitted from the TSLS. Instead, the lock manager may maintain in the locking context of each active transaction direct pointers to its corresponding SO lock states. Thus, each locking operation resulting in a SO lock state is saved a TSLS search. This method is directly applicable to lock delegation. For instance, if delegating a lock results in a SO lock state, then the TSLS does not need to be searched. Instead, the resource's pointer to the lock state representing its lock is atomically replaced with the pointer to the SO lock state found in the locking context of the delegatee. These and other efficiency improvements may be included in a given implementation.

Memoization-Based Delegation

Memoization is a technique that can be successfully used to speeding up locking operations in implementations that employ lock state sharing. The principle of memoization is adapted to lock management as follows. Each thread acting on behalf of a transaction is supplemented with a small memoization cache. In a simple form, the cache has one entry per locking operation. Each cache entry includes a pair of pointers to shared lock states, denoted i (initial) and f (final). The values of these shared lock states are related by the relation f=op (T, i), where T is the transaction owning the memoization cache, and op is the locking operation associated with the memoization cache entry made of i and f. Transaction T is an implicit key to the cache since each cache is associated to only one transaction.

For a given locking operation op operating on an object o, the memoization cache is used as follows: if lock (o)=i, then lock (o) is atomically replaced with f; otherwise, the lock manager is invoked to compute op (T, lock (o)), lock (o) is atomically replaced with op (T, lock(o)), and the memoization cache is updated with the pair lock (o), op (T. lock (o)).

In a SPARC V9 implementation, probing the memoization cache and subsequently exchanging the current lock pointer with the probe's result upon a cache hit takes 6 instructions. To this, one must add any additional instructions for setting up the memoization sequence, which includes instructions for whatever calling convention is used if memoization sequences are not inlined, plus instructions for setting registers to the addresses of both the memoization cache and the location of the resource's pointer to the shared lock state representing that resource's lock. Overall, an inlined memoized locking operation rarely takes more than 10 SPARC instructions.

SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems.

To adapt this mechanism to lock delegation, a more complex key is employed to lookup cache entries associated to lock delegation operations. The new key uniquely identifies the triple made of the delegators, the delegatees, and the initial lock value (represented by a lock pointer). This substantially increases the number of instructions to use a memoization cache. A solution to circumvent this problem is to allocate a memoization cache for each multiple-lock delegation requests, that is, requests for delegating the locks of several resources. Such requests specify a set of resource whose lock must be delegated. They are processed by iterating over the delegated resources (explicitly identified in the lock delegation operation), and delegating their locks one by one. In this case, the delegators and delegatees remains fixed across the multiple single lock delegation operations that are performed. Hence, a cache entry need only include a pair of pointers to shared lock state. The delegators and delegatees are implicit. The memoization cache can be allocated for the duration of the multiple-lock delegation operations (typically, as an automatic variable on the thread's stack), and memoization can be performed as indicated above. The use of memoization for such requests may be parameterized according to some threshold on the number of delegated locks.

Memoized lock delegation saves a complex full-blown lock delegation operation. In particular, it saves the costs of testing the validity of a lock delegation since a cache hit means that a similar delegation has already been validated. However, a single-lock delegation operation pays the complexity of computing a key based on the delegators, delegatees and initial lock state. Accordingly, in some implementations, it may be desirable to limit use of memoization techniques to multiple-lock delegation operations.

Bulk Lock Delegation

A lock delegation is said to happen in bulk when the lock manager is requested to delegate at once all the relevant locks of some transactions to one or several other transactions. As described above, a bulk lock delegation operation may, in general, allow some selection of those locks to be delegated, for example, in some implementations it may be desirable to delegate only locks owned (or held) in a particular mode (e.g., read locks, write locks), locks protecting new objects only, etc. Nonetheless, for simplicity, the description that follows focuses on an exemplary case of bulk delegations that delegate all the locks of the delegator transaction(s). Accordingly, as used herein, "all locks" will be understood to be all the relevant locks given some particular implementation.

In the context of lock state sharing, bulk delegation offers computational efficiency when the number of locks of the delegators is larger than the total number of lock values representing current locks, which is usually the case. In this case, neither the lock manager nor its clients need to explicitly keep track of locked resources. Instead, the lock manager can find the locks of the delegators by scanning the TSLS, and modify their value atomically with respect to other operations.

Modifying a shared lock state of the TSLS has two consequences. First, the position of the shared lock state in the TSLS should be changed according to its new value, since this value is used as a key for associative search. Second, the modification of the shared lock state may have turned it into a duplicate of an existing shared lock state of the TSLS. That is, the new value may already exist in the TSLS. Having such duplicates is not incorrect, but it is sub-optimal in terms of memory consumption. Duplicates that may be subject to further updates as a result of some subsequent bulk operations (e.g., bulk lock release, or bulk delegation) should be tracked in order to apply the corresponding updates to them as well. Such tracking is necessary since some duplicates may still be used to represent the value of the lock of some resources. Duplicates can be eliminated once no resource uses them to represent the value of their lock. In some realizations, a lock manager may eagerly reclaim duplicates asynchronously with the help of a resource manager by atomically exchanging all pointers to a duplicate with pointers to its original.

As explained above, some of the locks of the delegators may also be represented by duplicates. Hence, bulk delegation should also modify these duplicates to reflect the effect of lock delegation. Note that once modified, a duplicate remains a duplicate, but of another lock state. This is because the original that was duplicated has also gone through the same modification. Lastly, as already mentioned, some frequently used shared lock states may be omitted from the TSLS in some realizations. Typically, the shared lock states that represent single-owner lock value may be omitted. Modifying such single-owner lock values for delegation may also change them into duplicates of another shared lock state. Alternate storage for certain lock states (e.g., single-owner lock values) is omitted in some of the description that follows.

Figure 2:
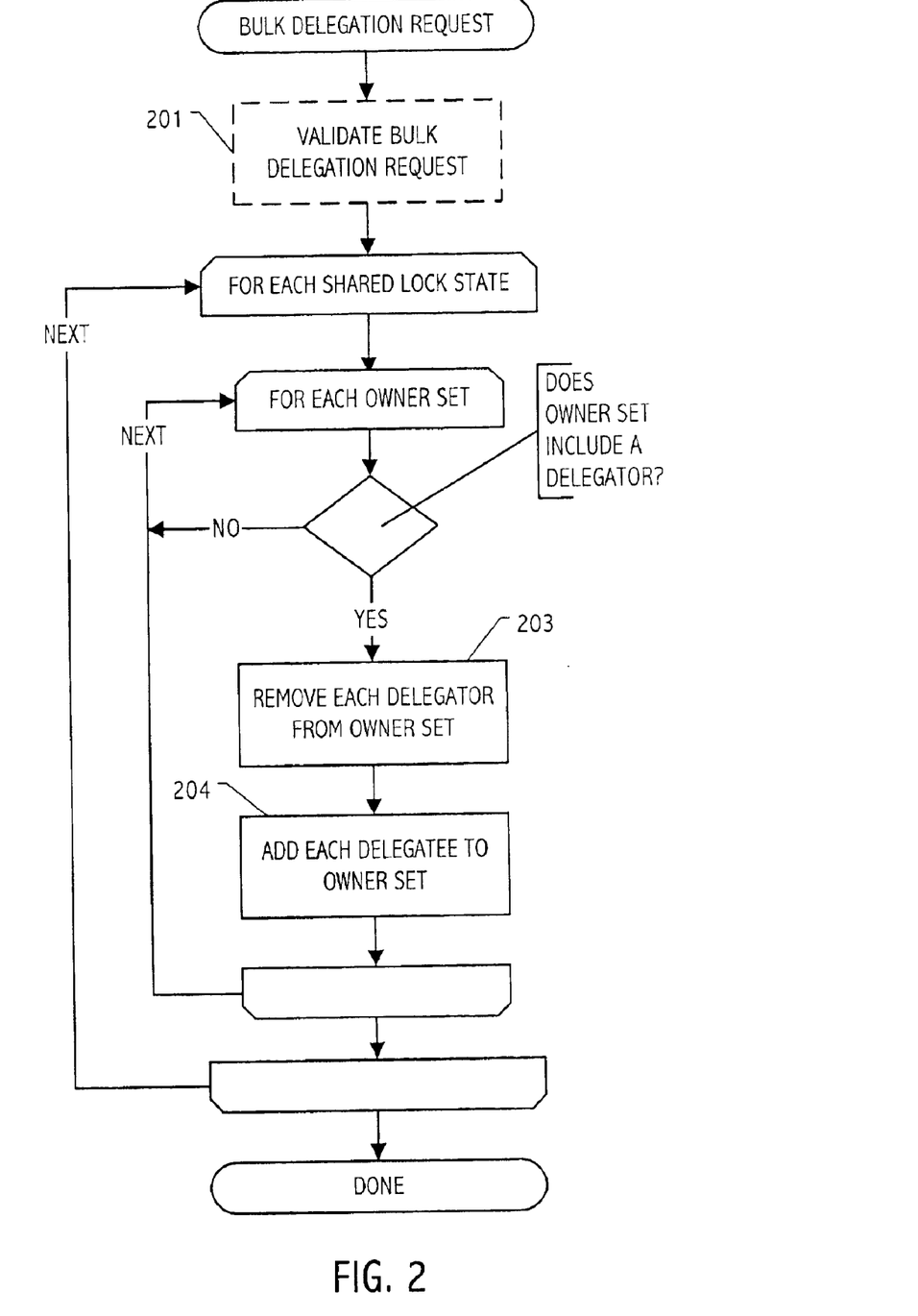
FIG. 2 is a flowchart that depicts an exemplary functional sequence for performing a bulk delegation of locks in accordance with some embodiments of the present invention.
Figure 3:
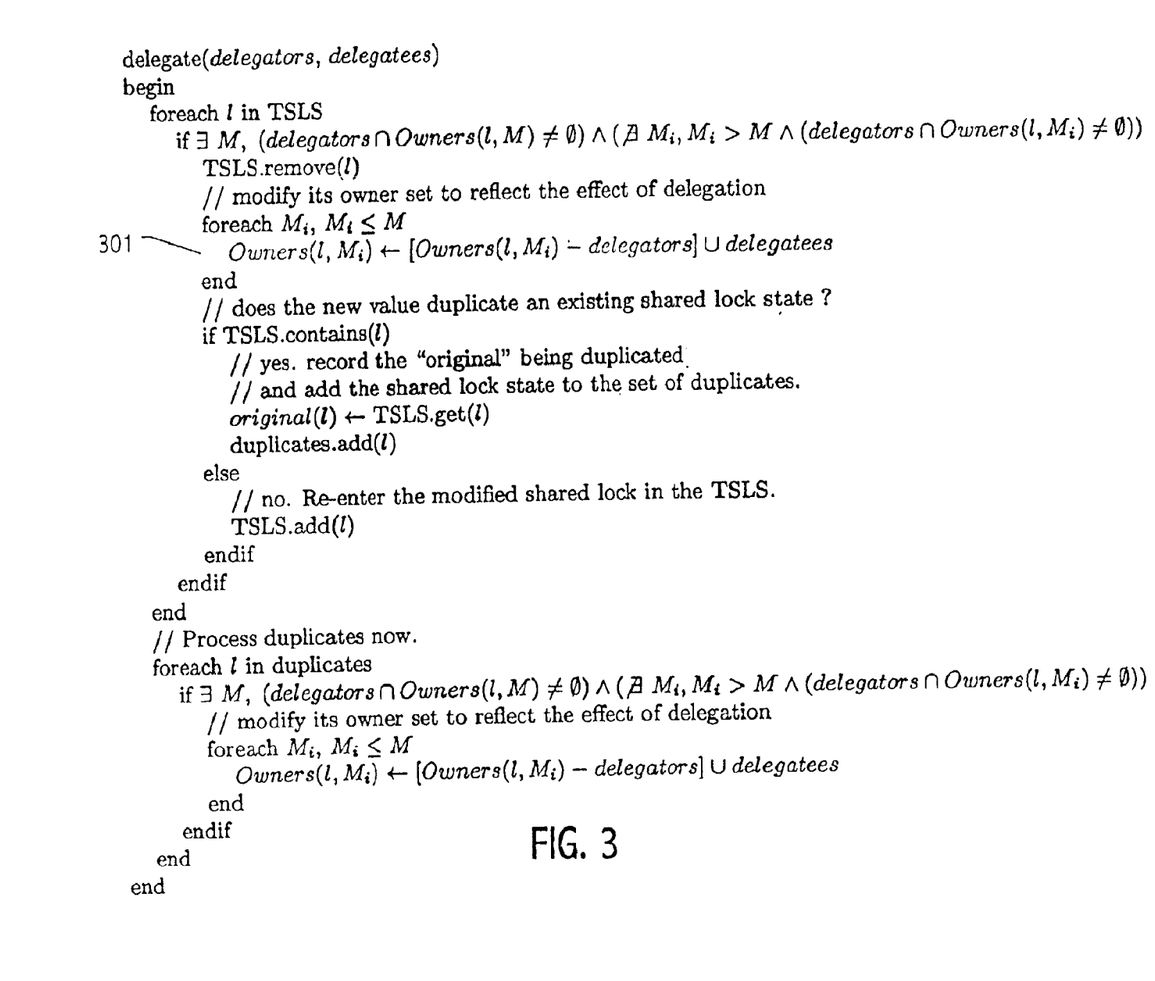
FIG. 3 depicts pseudocode that provides an exemplary functional sequence for performing a bulk delegation of locks in accordance with some embodiments of the present invention.

FIGS. 2 and 3 illustrate how bulk delegation proceeds in an exemplary implementation. In particular, FIG. 2 depicts an exemplary functional sequence. In response to a bulk delegation request, which may be validated (201) in some implementations, shared lock state values in an encoding of a set of shared lock states (e.g., the TSLS and any ancillary data structures) are checked to determine whether one of the owner sets for the lock value includes a delegator transaction. If so, each delegator transaction is deleted (203) from the owner set(s) of the shared lock state where it appears and each delegatee transaction is added (204) thereto. FIG. 3 more formally depicts an exemplary functional sequence for performing a bulk delegation of locks. More particularly, operation 301 implements for each relevant locking mode, the removal of delegators and addition of delegatees. Additional operations manage and process duplicates.

Validity of Lock Delegation

Figure 5:
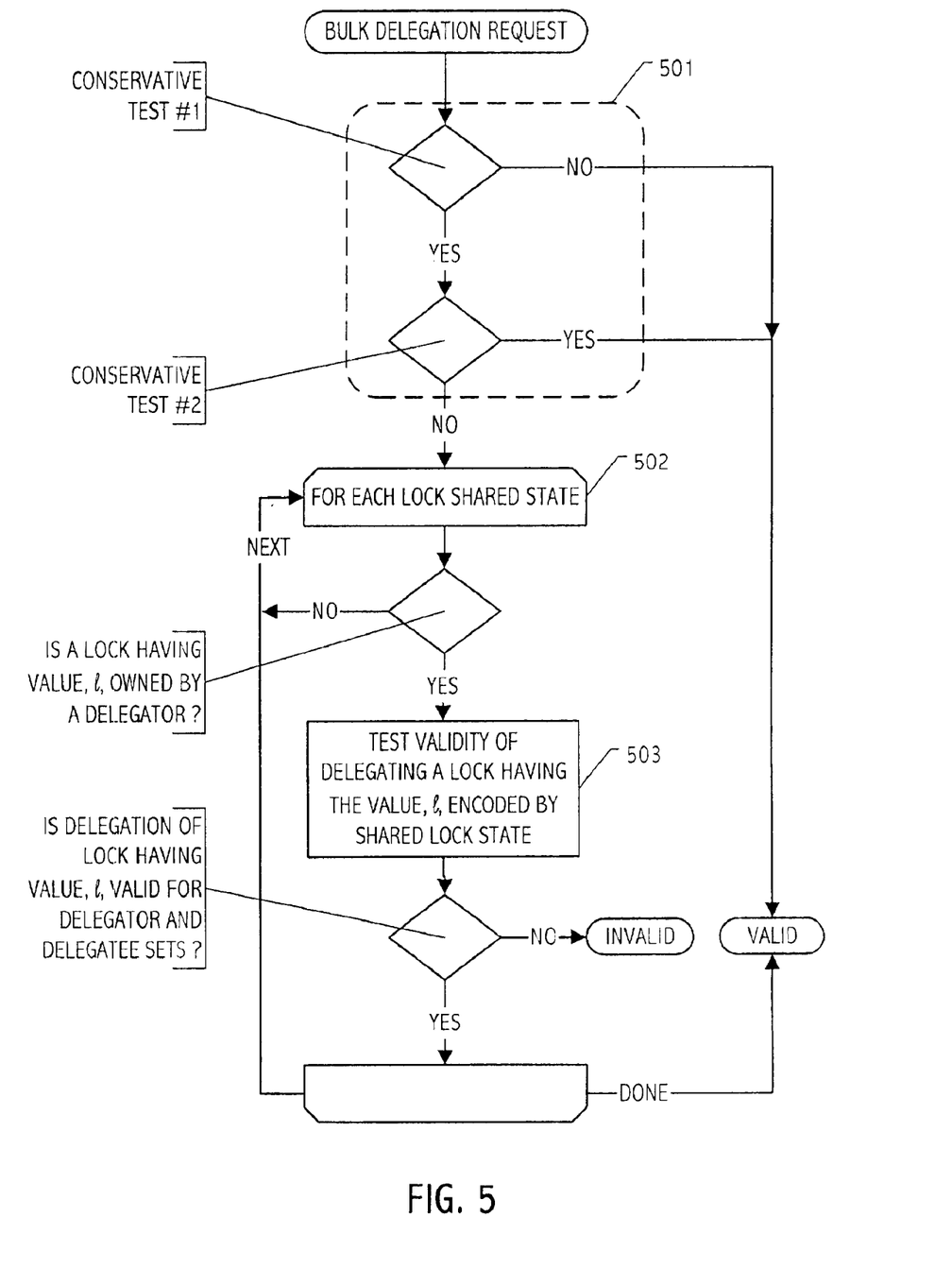
FIG. 5 is a flowchart that depicts an exemplary functional sequence in accordance with some embodiments of the present invention, in which validity of a bulk delegation request is determined using an initial conservative, but computationally efficient, test or tests and, if such an initial test is inconclusive, using a thorough evaluation of the delegation request for each shared lock state to which it applies.

Some realizations implement validation of bulk delegation requests. For example, as illustrated in FIG. 2, validation 201 may be performed prior to performance of the bulk delegation. One illustrative implementation of a validation method is illustrated in FIG. 5 and includes initial use of computationally-efficient, though conservative, tests 501 followed, if necessary, by a general method which (in comparison) is computationally-expensive. The description that follows focuses first on the general method. Use of additional tests as optimizations will then be better understood in the context of the general method.

The general method includes iterating (502) over an encoding of the set of shared lock states, and for each shared lock state of the encoding having at least one associated owner set that includes at least one of the delegator transactions, applying a validation test. In general, a delegation is valid if and only if the new value of the lock can also be achieved by some sequence of lock acquisitions. In other words, delegation is valid if and only if it is possible to verifying that none of the delegatees conflict with the remaining current owners of the lock (i.e., those that do not delegate the lock). Accordingly, delegating a lock owned in read mode only is always valid. Similarly, delegating a lock with a single owner to a single delegates is always valid, irrespectively of the mode in which the lock is owned.

A request for delegating a lock to multiple transactions may be invalid when the delegatees cannot ignore-conflict between each other. For instance, delegation of a write lock from one transaction to two other transactions is invalid if the two transactions cannot ignore write-write conflicts between each other.

A request for delegating a lock may also be invalid when the lock is owned in incompatible modes by multiple transactions. Locks with multi-mode ownerships result from using ignore-conflict relationships between transactions. The same relationships may not hold between the remaining owner of the lock and some or all of the delegates. In such case, the request is invalid. For instance, let us assume two transactions $T_1$ and $T_2$ such that $T_1$ can ignore read-write conflicts with $T_2$ and, symmetrically, $T_2$ can ignore write-read conflicts with $T_1$. Let l be a lock such that Owners (l, Read) ={Ti } and Owners (l, Write)={$T_2$}. Delegation of l by $T_1$ to another transaction T is valid only if T can also ignore read-write conflicts with $T_2$ and symmetrically, $T_2$ can ignore write-read conflicts with T.

In general, the validity of a bulk lock delegation should be determined before performing any actual lock delegation, otherwise, many locks may have been delegated before realizing that the request is invalid. A straightforward method for verifying the validity of a bulk delegation is to scan the TSLS a first time and apply the validation test for every shared lock state representing the value of a lock that is going to be delegated. Note that duplicates of shared lock states do not need to be scanned to determine the validity of a request.

Figure 4:
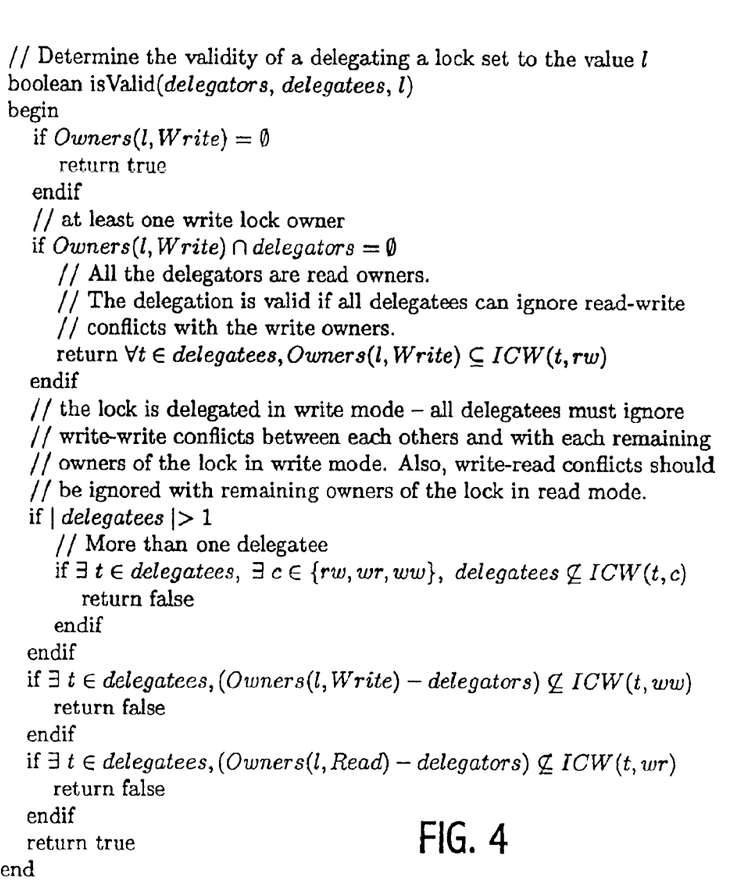
FIG. 4 depicts pseudocode that provides an exemplary functional sequence for determining the validity of a delegation of a lock value from one or more delegators to one or more delegates in accordance with some embodiments of the present invention.

FIG. 4 formally illustrates a functional sequence that implements such a general validation test for delegation of a single lock. Such a functional sequence may be employed as general validation test 503 and as employed for lock-value by lock-value validation (601) in the formal illustration of FIG. 6 (described below). The general validation test can benefit from various implementation dependent lock state information. For instance, in some implementation, a lock value carries a type of information that indicates whether the lock is owned by a single transaction only. In this case, delegating a lock owned by one transaction only to another transaction is always valid, and validation is not needed.

This costly additional scan may be avoided in common situations by using two simple conservative tests presented below. The two conservative tests are illustrated in FIG. 5 and more formally specified in FIG. 6. The first conservative test, test 602, builds on the concept of a set of transactions that belong to the owner set of at least one read-write shared lock state. A conservative estimate of this wset can be efficiently maintained for comparison against the set of delegators. The use of such a wset will be understood as follows.

If all the delegated locks are owned in read mode only, the request is intrinsically valid since there cannot be any conflicts. This compatibility can be quickly determined if the TSLS keeps track of all the transactions that belong to one or more owner sets of at least one read-write shared lock state recorded in the TSLS. This set, denoted wset, is only a conservative indication of the set $$\bigcup_{\forall l \in TSLS, Owners(l, Write) \neq \emptyset} (Owners(l, Read) \cup Owners(l, Write))$$

It is conservative in the sense that it is a superset of the set of transactions involved in at least one read-write shared lock states. Trying to precisely maintain wset can be computationally expensive. Instead, a fairly precise conservative estimation of wset can be maintained as follows:

Whenever a shared lock state l such that Owners (l, Write)≠∅ is recorded in the TSLS, (Owners (l, Read) ∪ Owners (l, Write)) is added to wset.

Whenever the TSLS is scanned for a bulk lock operation (e.g., delegation or release), wset is recomputed.

Recomputing wset upon every scan of the TSLS is inexpensive (especially-if owner sets are implemented as bitmaps) and makes wset accurate again. Inaccuracy results from executing non-bulk lock delegation or lock release operations, but is tolerable because any such inaccuracy simply overstates the contents the wset. Note that if the transaction processing system does not have recourse to single lock delegation and single lock release operations, then wset will always accurate.

Figure 6:
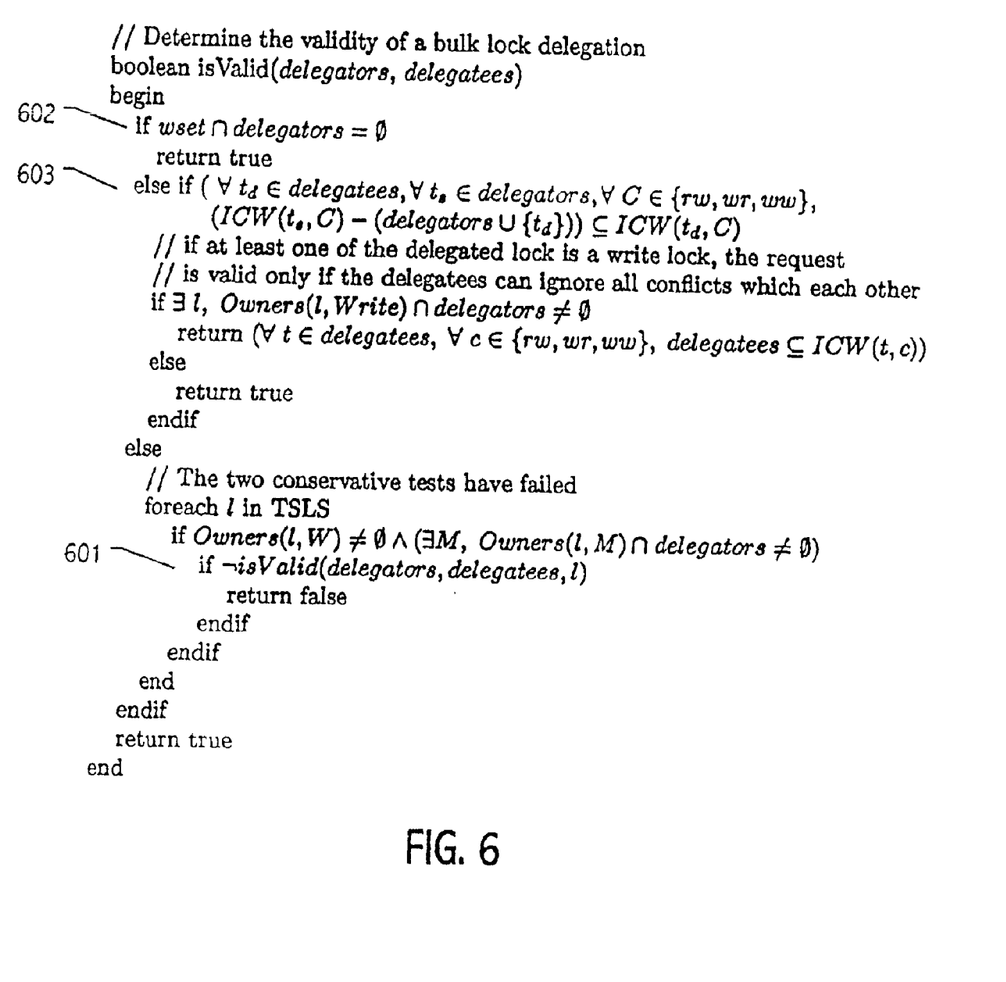
FIG. 6 depicts pseudocode that provides an exemplary functional sequence in accordance with some embodiments of the present invention for determining the validity of a bulk delegation.

In the validation technique illustrated in FIG. 6, a second conservative test, test 603, is employed if test 602 fails to assure the validity of the requested bulk delegation. The second conservative test, test 603, begins by determining if a requested bulk lock delegation is valid by comparing the ignore-conflict relationships of the delegators and the delegatees. If a transaction delegates all its lock to another transaction, then, the delegation is guaranteed to be valid if, for each type of conflicts, the set of transactions that the delegates can ignore conflicts with is a super-set of each of the sets of transactions that each of the delegators can ignore conflicts with. This test can be generalized to multiple delegators and delegatees as follows:

$\forall t_d \in$ delegates, $\forall t_s \in$ delegators, $\forall C \in \{rw, wr, ww\}$, $(ICW(t_s, C)-(delegators \cup \{t_d\})) \subseteq ICW(t_d, C)$ This initial test is then combined with a second test verifying that all the delegatees can ignore conflict with each other if at least one of the delegated locks is owned in write mode by at least one of the delegators. If both component tests of conservative test 603 are satisfied, then validity of the requested bulk delegation is assured.

Pseudocode of FIG. 6 formally illustrates one particular realization of test 603; however, more generally, test 603 may be understood as follows.

(1) If there are no delegates transactions such that, for each type of conflict, the corresponding set of transactions with which the delegatee can ignore conflicts is not a super-set of the set of transactions that includes those transactions with which delegator transactions can ignore conflict of this type, excluding the delegator transactions themselves, and (2) if there is at least one shared lock state representing a write lock owned by at least one of the delegator transactions and there are no delegatee transaction such that the delegatee transaction cannot ignore conflict with all the other delegatee transactions, then, validity of the requested bulk delegation is assured.

In general, for the second part of test 603 to work efficiently, a second set can keep track of those transactions for which there is at least one shared lock state of the encoding of the set of shared lock states that represents the value of a lock owned in write mode by those transactions. Note that this second set is a subset of the set used for the conservative test 602 and can be maintained in almost the same way except for the transactions that are added to the set upon an update of the set, i.e., only the write owners of shared lock states are added to the set, instead of the union of the read and write owners.

Although tests 602 and 603 are efficient and cover most common cases, the two tests presented above are conservative, and therefore, their failure does not necessarily indicate that a delegation is invalid. In such case, to precisely determine validity, the implementation of FIG. 6 finds the value of the locks currently owned by the delegators, employing the general validation test procedure illustrated above with reference to FIG. 4.

It will be understood that the general method can be used alone, or with one or both of the conservative tests. In general, potential combinations include following:

1. Apply the general method,
2. if conservative test 602 is false, apply the general method.
3. if conservative test 602 is false, apply conservative test 603; if conservative test 603 is false, apply the general method.

For clarity of illustration, the realization formally described using pseudocode in FIG. 6 only takes into account the locks of the delegators represented by shared locks states recorded in the TSLS. Based on the description herein, persons of ordinary skill in the art will appreciate the desirability of representing certain lock states outside a TSLS encoding. Accordingly, in an implementation that does not record some lock state in the TSLS, additional verification is needed. For instance, if frequently used lock states, such as SO lock states, are maintained outside of the TSLS, the validity test needs to take them into account. Additions to traverse additional data encodings of some locks states are straightforward.

In practice, it is a good idea to split the TSLS into two tables: one for read only shared lock states, and one for read-write shared lock states. This reduces the costs related to validation, such as scanning the TSLS for read-write lock states, or re-evaluating the wset, since only scans of the read-write TSLS sub-table would be subject to these additional costs.

Impact on Queue Management

Lock delegation may change the status of a pending lock request. The most straightforward case is when a lock with a non-empty pending queue is delegated to one of the transactions waiting for the lock. A less trivial example, occurs when a lock is delegated to a transaction with ignore-conflict relationships with another transaction waiting for the delegated lock. For instance, let us assume three transactions $T_1$, $T_2$ and $T_3$ such that $T_3$ can ignore read-write conflict with $T_2$, and $T_3$ is currently waiting for a read lock request for an object o locked in write mode by $T_1$ only (i.e., Owners (lock (o), Write)=$\{T_1\}$ and Owner (lock (o), Read)=$\emptyset$ and Q (lock (l))=$\{T_3\}$). If $T_1$ delegates its lock to $T_2$, then $T_3$ can be granted the lock immediately as well. Hence, upon a lock delegation, the lock manager re-evaluates the queue of pending request.

Illustrative Variations

While the invention has been described with reference to various embodiments, it will be understood that these embodiments are illustrative and that the scope of the invention is not limited to them. Many variations, modifications, additions, and improvements are possible. In addition, to those described above, two major sources of variation include (1) use of the bulk delegation of locking capabilities that are associated with entities or objects (e.g., transactions cooperating groups, logical databases, etc.) that control visibility or access to shared data or resources, and (2) differing and/or more complex sets of locking modes.

One illustrative set of locking modes includes browse (B), read (R), intention to read (IR), upgrade (U), write (W), intention to write (IW) and read with intention to write (RIW). Of these, R, B and IR can be classified as modes having read semantics ($M_r$) and W, U, IW, and RIW can be classified as modes having write semantics. Although a variety of conditional compatibility configurations are possible, in one exemplary configuration, the following modes may be considered conditionally compatible:

| $M_r$ | $M_w$ |
|---|---|
| R | W |
| R | U |
| R | IW |
| R | RIW |
| IR | U |
| IR | W |

Other commonly employed lock modes include intention none (IN), share or shared (S), intent share (IS), update (U), exclusive (X), intent exclusive (IX) and share with intent exclusive (SIX), which generally correspond to the previously introduced browse, read, intention to read, upgrade, write, intention to write and read with intention to write lock modes. In general, the set of lock modes employed is implementation dependent and any suitable set may be employed. Based on the detailed description herein of bulk delegation and validation techniques in the context of read and write lock modes, persons of ordinary skill in the art will appreciate suitable variations for alternative sets of lock modes.

More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of operating a transaction system which supports bulk delegations of locks from one or more delegator transactions to one or more delegatee transactions, the method comprising:

validating at least a subset of the bulk lock delegations by, for each delegated lock owned by a delegator transaction, testing validity of delegating the lock based, at least in part, on ignore conflicts relationships amongst the delegatee transactions and between the delegatee transactions and otherwise incompatible-mode owners of locks, which would remain after completion of the bulk delegation.

2. A method, as recited in claim 1, further comprising:
performing the validated bulk lock delegations.

3. A method, as recited in claim 1, further comprising:
representing locks of identical value as references to a shared lock state encoding the value.

4. A method, as recited in claim 3, wherein a subset of the shared lock states is encoded in an associative table of shared lock states (TSLS).

5. A method, as recited in claim 1, further comprising:
obviating the testing of each lock for at least another subset of the bulk lock delegations by performing one or more conservative tests.

6. A method, as recited in claim 5,
wherein the one or more conservative tests include testing for disjunction of a set of delegator transactions and a wset.

7. A method, as recited in claim 6, further comprising:
adding a corresponding entry to the wset coincident with recording of a lock owned in a write mode; and
recomputing the wset by scanning the locks.

8. A method, as recited in claim 5, wherein the one or more conservative tests includes:
determining for each particular one of the delegator transactions, whether there are no delegatee transactions such that, for each type of conflict, a corresponding first set of transactions with which the delegatee can ignore conflicts is not a super-set of a second set of transactions that includes those transactions with which the particular delegator transaction can ignore conflicts of such type, excluding the delegator transactions themselves, and if there is at least one write lock owned by at least one of the delegator transactions, then determining whether all delegatees can ignore conflicts with each other.

9. A method, as recited in claim 1, performed by a lock manager in a transaction processing system.

10. In a computational system wherein a value of a lock is encoded to identify (i) a set of one or more transactions that own the lock and (ii) respective one or more modes in which such transactions own the lock, and wherein at least some locks of equal value are represented using a same shared lock state, a method of validating bulk delegation of locks from one or more delegator transactions to one or more delegatee transactions, the method comprising:

for at least a subset of the bulk delegations, and for each shared lock state encoding having an associated owner set that includes at least one of the delegator transactions, testing validity of delegating a lock represented thereby based, at least in part, on ignore conflicts relationships amongst the delegatee transactions and between the delegatee transactions and otherwise incompatible-mode owners that would remain after completion of the bulk delegation.

11. A method, as recited in claim 10, further comprising: for each of the bulk delegations, performing one or more conservative validation tests and thereby obviating, for another subset of the bulk delegations) the validity testing for each shared lock state encoding.

12. A method, as recited in claim 11,
wherein the one or more conservative tests include testing for disjunction of a set of delegator transactions and a wset.

13. A method, as recited in claim 12, further comprising:
adding a corresponding entry to the wset coincident with recording of a lock value held in a write mode; and
recomputing the wset upon each scan of the shared lock states.

14. A method, as recited in claim 11, wherein the one or more conservative tests includes:
determining for each particular one of the delegator transactions, whether there are no delegatee transactions such that, for each type of conflict, a corresponding first set of transactions with which the delegatee can ignore conflicts is not a super-set of a second set of transactions that includes those transactions with which the particular delegator transaction can ignore conflicts of such type, excluding the delegator transactions themselves, and
if there is at least one write lock owned by at least one of the delegator transactions, then determining whether all delegatees can ignore conflicts with each other.

15. A method, as recited in claim 10,
wherein the shared lock states are at least partially encoded in an associative table of shared lock states (TSLS).

16. A method, as recited in claim 15,
wherein at least a subset of the shared lock states that represent locks owned by a single owner is encoded separately from the table of shared lock states (TSLS).

17. A method, as recited in claim 15,
wherein at least a frequently used subset of the shared lock states is encoded separately from the table of shared lock states (TSLS).

18. In a computational system wherein locks of identical value are represented as references to a shared lock state encoding of the value, a method of implementing a bulk delegation of locks from one or more delegator transactions to one or more delegatee transactions, the method comprising:

validating the bulk delegation based at least in part on ignore conflicts relationships amongst the delegatee transactions; and
if validated, performing the bulk delegation.

19. The method of claim 18,
wherein the performing of the bulk delegation includes, for each shared lock state encoding having an associated owner set that includes one of the delegator transactions, removing from the owner set each of the delegator transactions and adding thereto each of the delegatee transactions.

20. The method of claim 18,
wherein the validating is based on ignore conflicts relationships amongst the delegatee transactions and between the delegatee transactions and otherwise incompatible-mode owners that would remain after completion of the bulk delegation.

21. The method of claim 18,
wherein the validating is based on one or more conservative validation tests that, if successful, obviate validity testing for each shared lock state; and
wherein, if not obviated by the one or more conservative validation tests, the validating includes, for each shared lock state encoding having an associated owner set that includes at least one of the delegator transactions, testing validity of delegating a lock represented thereby based, at least in part, on ignore conflicts relationships amongst the delegatee transactions and between the delegatee transactions and otherwise incompatible-mode owners that would remain after completion of the bulk delegation.

22. A transaction processing system that supports bulk delegation of locks, the transaction processing system comprising:

a lock manager that associates locking capabilities with transactions and that allows specification of certain conflicts between locking capabilities to be ignored; and
an encoding of ignore conflicts relationships amongst the transactions, the lock manager implementing at least a subset of bulk delegation operations by fist validating requests therefor based on encoded ignore conflicts relationships amongst the delegatee transactions and between the delegatee transactions and otherwise incompatible-mode owners that which would remain after completion of the bulk delegation, and if the requests are validated by performing the bulk delegation operations.

23. The transaction processing system of claim 22,
wherein the transaction processing system implements a transaction model that supports a nested conflict serializability correctness criterion; and
wherein the bulk delegation operation is employed to support creation, commitment or abortion of a subdatabase.

24. The transaction processing system of claim 22, wherein as part of an initial computationally-efficient, but conservative, validation, the lock manager:
verifies that, for each delegator transaction and type of conflict between lock modes, a set of transactions with which a particular delegatee transaction can ignore conflicts is a super-set of the set of transactions with which the delegator transaction can ignore conflicts; and
if at least one to-be-delegated lock is owned in a write mode by at least one of the delegator transactions, further verifies that each of the delegatee transactions can ignore conflicts with each other.

25. A computer implemented lock manager that implements a bulk delegation operation by validating a bulk delegation request based, at least in part, on ignore conflicts relationships amongst delegatee transactions.

26. The lock manager of claim 25, wherein the lock manager is executable in a transaction processing environment that associates locking capabilities with transactions and allows specification of certain conflicts between locking capabilities to be ignored.

27. A computer program product encoded in one or more computer readable media and comprising:
  definition of a data structure instantiable in memory to represent plural locks having identical lock values using a single shared lock state encoding;
  lock manager instructions executable by a processor to associate locking capabilities with transactions, to specify certain conflicts between locking capabilities to be ignored, to manage the shared lock state encoding, and to implement a bulk delegation of locks from one or more delegator transactions to one or more delegatee transactions, wherein the lock manager instructions validate a bulk delegation request based, at least in part, on ignore conflicts relationships amongst the delegatee transactions.

28. The computer program product of claim 27, wherein, if the bulk delegation request is successfully validated, the bulk delegation is performed by the lock manager.

29. The computer program product of claim 27, wherein the one or more computer readable media are selected from the set of a disk, tape or other magnetic, optical or electronic storage medium and a network, wireline, wireless or other communications medium.

30. An apparatus comprising:
  means for representing plural locks having identical values using a single shared lock state encoding; and
  means for validating a bulk delegation of locks from one or more delegator transactions to one or more delegatee transactions based, at least in part, on ignore conflicts relationships amongst the delegatee transactions.

31. The lock manager of claim 25, wherein the lock manager is encoded in one or more computer readable media.

32. The lock manager of claim 31, wherein the computer readable media includes one or more of magnetic storage medium, optical storage medium, magneto-optical storage medium, read only memory, random access memory, erasable programmable memory, flash memory, and propagated signal.

33. A method of operating a system that supports bulk locking capability delegation comprising:
  testing bulk locking capability delegation validity of each of a plurality of locking capabilities to be delegated to one or more delegatee entities from one or more delegator entities, said testing based, at least in part, on conflicts relationships amongst the delegatee entities; and
  validating the bulk locking capability delegation of the plurality of locking capabilities based, at least in part, on said testing.

34. The method of claim 33, wherein the delegator entities and the delegatee entities include one or more of transactions, logical databases, and cooperating groups.

35. The method of claim 33, wherein said testing is further based on conflict relationships between the delegatee entities and owner entities of the plurality of locking capabilities.

36. The method of claim 33 further comprising preventing a requested bulk locking capability delegation if the requested bulk locking capability delegation fails said testing.

* * * * *

UNITED STATES PATENT AND TRADEMARK OFFICE
CERTIFICATE OF CORRECTION

PATENT NO. : 6,910,039 B2
DATED : June 21, 2005
INVENTOR(S) : Laurent P. Daynès

It is certified that error appears in the above-identified patent and that said Letters Patent is hereby corrected as shown below:

Title page,
Item [56], References Cited, OTHER PUBLICATIONS,
"Barbara Liskov et al." reference, delete "International" and replace with
-- International --;
"Laurent Daynes et al." reference, delete "Locking on" and replace with
-- Locking in --;
"Roger S. Barga and Calton Pu" reference, delete "Kluwe" and replace with
-- Kluwer --;
"T. Harder et al." reference, delete "[2005]0" and replace with -- [2005] --; and
"E. T. Mueller, J. D. Moore and G. J. Popek" reference, delete "~bepierce/courses/" and replace with -- ~bcpierce/courses/ --.

Column 1,
Line 21, delete "modem" and replace with -- modern --.

Column 3,
Line 29, delete "the" and replace with -- -the --.
Line 31, delete "ignore-conflict" and replace with -- -ignore-conflict --.
Line 34, delete "given" and replace with -- -given --.

Column 4,
Lines 28, 39, 41 and 52, delete "delegates" and replace with -- delegatee --.

Signed and Sealed this

Twenty-eighth Day of February, 2006

JON W. DUDAS
*Director of the United States Patent and Trademark Office*